(12) United States Patent
Uchino et al.

(10) Patent No.: US 9,820,196 B2
(45) Date of Patent: Nov. 14, 2017

(54) MOBILE COMMUNICATION SYSTEM, RADIO BASE STATION, AND MOBILE STATION

(71) Applicant: NTT DOCOMO, INC., Tokyo (JP)

(72) Inventors: Tooru Uchino, Tokyo (JP); Wuri Andarmawanti Hapsari, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 84 days.

(21) Appl. No.: 14/646,114

(22) PCT Filed: Nov. 15, 2013

(86) PCT No.: PCT/JP2013/080855
§ 371 (c)(1),
(2) Date: May 20, 2015

(87) PCT Pub. No.: WO2014/080837
PCT Pub. Date: May 30, 2014

(65) Prior Publication Data
US 2015/0296425 A1    Oct. 15, 2015

(30) Foreign Application Priority Data
Nov. 22, 2012 (JP) ................. 2012-256260

(51) Int. Cl.
*H04W 84/04* (2009.01)
*H04W 36/00* (2009.01)
(Continued)

(52) U.S. Cl.
CPC ......... *H04W 36/0038* (2013.01); *H04J 11/00* (2013.01); *H04L 5/00* (2013.01);
(Continued)

(58) Field of Classification Search
CPC .......... H04W 84/045; H04W 36/0027; H04W 36/14; H04W 36/22; H04W 48/18; H04W 76/025; H04W 12/02; H04W 12/04
See application file for complete search history.

(56) References Cited

U.S. PATENT DOCUMENTS

2012/0113843 A1* 5/2012 Watfa ................ H04W 72/1289
370/252
2012/0309395 A1* 12/2012 Centonza ............ H04W 84/045
455/436

(Continued)

OTHER PUBLICATIONS

International Search Report issued in corresponding PCT Application No. PCT/JP2013/080855 dated Feb. 18, 2014 (1 page).

(Continued)

*Primary Examiner* — Raj Jain
(74) *Attorney, Agent, or Firm* — Osha Liang LLP

(57) ABSTRACT

A mobile station UE is enabled to perform appropriate security processing when the mobile station UE connected to a plurality of radio base stations eNB performs a handover while performing "Inter-site CA". In a mobile communication system of the present invention, a radio base station eNB#1 and a radio base station eNB#2 are configured to manage security data in cells #1 to #3 under control, and a radio base station eNB#3 and a radio base station eNB#10 are configured to manage no security data in a cell #10 under control. When the mobile station UE switches from a state where CA is performed through the cells #1 and #10 to a state where CA is performed through the cells #2 and #10, the mobile station UE is configured to be notified of information indicating from which PDCP-PDU the security data in the cell #2 is to be applied.

10 Claims, 7 Drawing Sheets

(51) Int. Cl.

| | |
|---|---|
| *H04J 11/00* | (2006.01) |
| *H04W 12/08* | (2009.01) |
| *H04W 16/28* | (2009.01) |
| *H04W 16/32* | (2009.01) |
| *H04W 28/16* | (2009.01) |
| *H04W 36/18* | (2009.01) |
| *H04W 12/10* | (2009.01) |
| *H04L 5/00* | (2006.01) |
| *H04W 88/08* | (2009.01) |
| *H04W 12/04* | (2009.01) |
| *H04L 29/06* | (2006.01) |

(52) U.S. Cl.
CPC ............. *H04L 5/001* (2013.01); *H04W 12/08* (2013.01); *H04W 12/10* (2013.01); *H04W 16/28* (2013.01); *H04W 16/32* (2013.01); *H04W 28/16* (2013.01); *H04W 36/0027* (2013.01); *H04W 36/18* (2013.01); *H04W 84/045* (2013.01); *H04W 88/08* (2013.01); *H04L 63/12* (2013.01); *H04W 12/04* (2013.01)

(56) References Cited

U.S. PATENT DOCUMENTS

| | | | | |
|---|---|---|---|---|
| 2013/0012249 | A1* | 1/2013 | Centonza | H04W 72/0426 455/501 |
| 2013/0089077 | A1* | 4/2013 | Sharony | H04W 36/14 370/332 |
| 2014/0219248 | A1* | 8/2014 | Reddiboyana | H04W 36/14 370/331 |
| 2015/0296425 | A1* | 10/2015 | Uchino | H04J 11/00 370/331 |
| 2016/0191471 | A1* | 6/2016 | Ryoo | H04W 12/04 455/411 |

OTHER PUBLICATIONS

CMCC; "Discussion on scenarios for small cell enhancement in Rel-12"; 3GPP TSG-RAN WG1 #71, R1-125061; New Orleans, Louisiana, USA; Nov. 12-26, 2012 (5 pages).

3GPP TR 36.932 V0.1.1; "3rd Generation Partnership Project; Technical Specification Group Radio Access Network; Scenarios and Requirements for Small Cell Enhancement for E-UTRA and E-UTRAN; (Release 12)"; Nov. 2012 (12 pages).

3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Sep. 2012 (205 pages).

3GPP TR 36.842 V12.0.0 "3rd Generation Partnership Project; Technical Specification Group Radio Access Network; Study on Small Cell enhancements for E-UTRA and E-UTRAN; Higher layer aspects", (Release 12), Dec. 2013 (71 pages).

\* cited by examiner

MOBILE COMMUNICATION SYSTEM, RADIO BASE STATION, AND MOBILE STATION

TECHNICAL FIELD

The present invention relates to a mobile communication system, a radio base station, and a mobile station.

BACKGROUND ART

In release 10 of LTE (Long Term Evolution), CA (Carrier Aggregation) in which a plurality of CCs (Component Carriers) under the same radio base station eNB are aggregated to perform communication as shown in part (a) of FIG. 5 has been introduced to achieve communication in a wide bandwidth exceeding 20 MHz (for example, communication of 100 MHz).

Later, Release-12 and beyond of LTE have proposed "Small Cell Enhancement", and "Inter-site CA" in which communication is performed by aggregating CCs (cells) under different radio base stations eNB has been considered to be introduced as one of network architectures which are more flexible than conventional architectures (see part (b) of FIG. 5).

For example, the following operation is conceivable by using "Inter-site CA". As shown in part (b) of FIG. 5, a C-plain signal for which reliability needs to be secured is communicated through a SRB (Signaling Radio Bearer) in a cell #1 (macro cell) under a radio base station eNB#1 (macro eNB), and a U-plane signal which requires broadband communication is communicated through a DRB (Data Radio Bearer) in a cell #10 (small cell) under a radio base station eNB#10 (small radio base station).

As described above, when the C-plane signal is communicated through the SRB in the cell #1 under the radio base station eNB#1 and the U-plane signal is communicated through the DRB in the cell #10 under the radio base station eNB#10, the radio base station eNB#1 is assumed to basically handle settings and connectivity between the mobile station UE and the radio base station eNB#1/radio base station eNB#10, as shown in FIG. 6.

In this case, a flexible operation (installation location and the like) of the small radio base station can be achieved by employing a configuration in which only the radio base station eNB#1 being an anchor radio base station manages the security data in the cells under the radio base stations and the radio base station eNB#10 being the small radio base station manages no security data in the cells under the radio base stations.

For example, the small radio base station can be installed at a location where a user can physically touch the small radio base station.

Moreover, since the number of nodes managing the security data is not large, complexity of a network can be reduced.

PRIOR ART DOCUMENT

Non-Patent Document

Non-patent document 1: 3GPP 36.300

SUMMARY OF THE INVENTION

Currently, there is considered an idea of enabling the mobile station UE connected to a plurality of radio base stations eNB (connected to cells under different radio base stations eNB) to perform a handover while performing the "Inter-site CA".

As shown part (a) of FIG. 7, in the existing CA, the mobile station UE can only perform CA via cells under the same radio base station eNB. Accordingly, the U-plane signal cannot be communicated until connection is established with a handover target radio base station (radio base station eNB#2).

Meanwhile, as shown in part (b) of FIG. 7, enabling the mobile station UE connected to a plurality of radio base stations eNB to perform a handover leads to achievement of the handover without interruption of the U-plane signal, and this has an advantage from a viewpoint of throughput.

However, the following problem occurs when only the anchor radio base station eNB manages the security data as described above. When the mobile station UE connected to the cell under the small radio base station eNB#10 performs a handover from the cell #1 under the radio base station eNB#1 which is the anchor radio base station eNB to the cell #2 under the radio base station eNB#2, the mobile station UE does not know which one of the security data in the cell #1 or the security data in the cell #2 is applied to a PDCP-PDU (Packet Data Convergence Protocol-Protocol Data Unit) received from the small radio base station eNB. The mobile station UE thus cannot perform security processing such as deciphering processing using the appropriate security data (see FIG. 8).

The present invention has been made in view of the problem described above, and an objective thereof is to provide a mobile communication system, a radio base station, and a mobile station which enable a mobile station UOE to perform appropriate security processing when the mobile station UE connected to a plurality of radio base stations eNB performs a handover while performing "Inter-site CA".

A first feature of the present invention is summarized as a mobile communication system including: a first radio base station; a second radio base station; a third radio base station; and a small radio base station connected under the third radio base station. Here, the first radio base station and the second radio base station are configured to manage security data in cells under control, and the third radio base station and the small radio base station are configured to manage no security data in a small cell under control, when a mobile station switches from a state where carrier aggregation is performed through the small cell and a first cell under the first radio base station to a state where the carrier aggregation is performed through the small cell and a second cell under the second radio base station, the mobile station is configured to be notified of information indicating from which PDCP-PDU the security data in the second cell is to be applied.

A second feature of the present invention is summarized as a radio base station in a mobile communication system including a first radio base station, a second radio base station, a third radio base station, and a small radio base station connected under the third radio base station, the radio base station capable of operating as the first radio base station or the second radio base station. Here, the radio base station is configured to manage security data in cells under control, and when a mobile station switches from a state where carrier aggregation is performed through the small cell and a first cell under the first radio base station to a state where the carrier aggregation is performed through the small cell and a second cell under the second radio base station, the radio base station is configured to notify the mobile station of information indicating from which PDCP-PDU the security data in the second cell is to be applied.

A third feature of the present invention is summarized as a mobile station capable of communicating with a first radio base station, a second radio base station, a third radio base station, and a small radio base station connected under the third radio base station. Here, in a case where the first radio base station and the second radio base station are configured to manage security data in cells under control and the third radio base station and the small radio base station are configured to manage no security data in a small cell under control, when the mobile station switches from a state where carrier aggregation is performed through the small cell and a first cell under the first radio base station to a state where the carrier aggregation is performed through the small cell and a second cell under the second radio base station, the mobile station is configured to determine from which PDCP-PDU the security data in the second cell is to be applied according to a notification from the first radio base station or the second radio base station.

BRIEF DESCRIPTION OF TEE DRAWINGS

Figure 5:
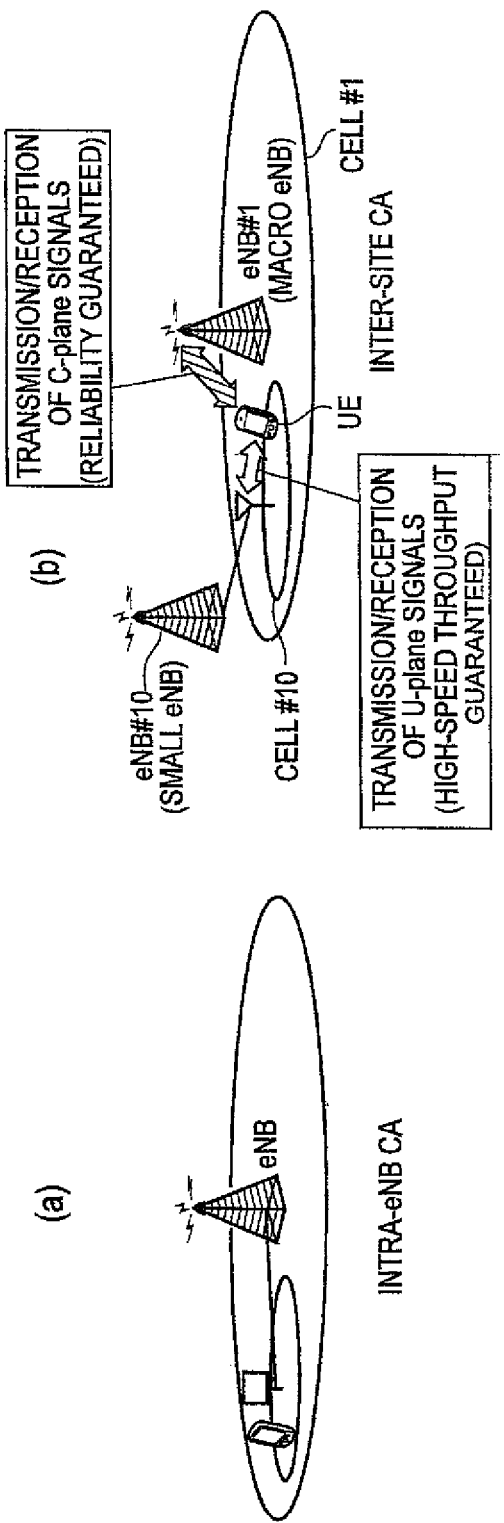
Figure 6:
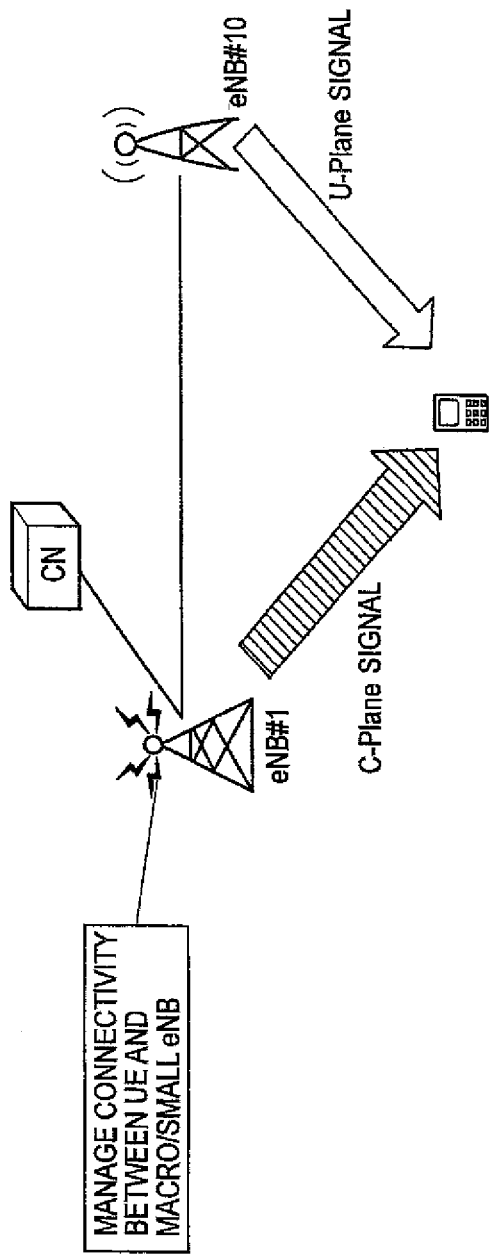
Figure 7:
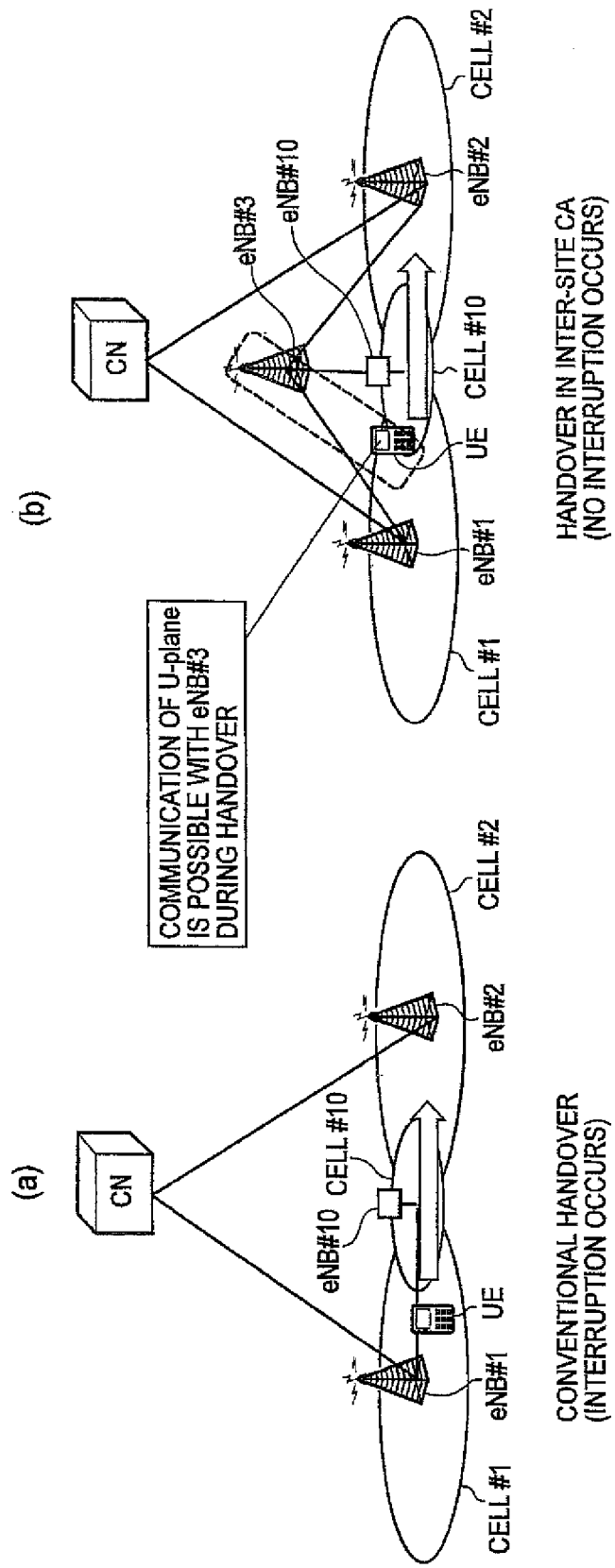
Figure 8:
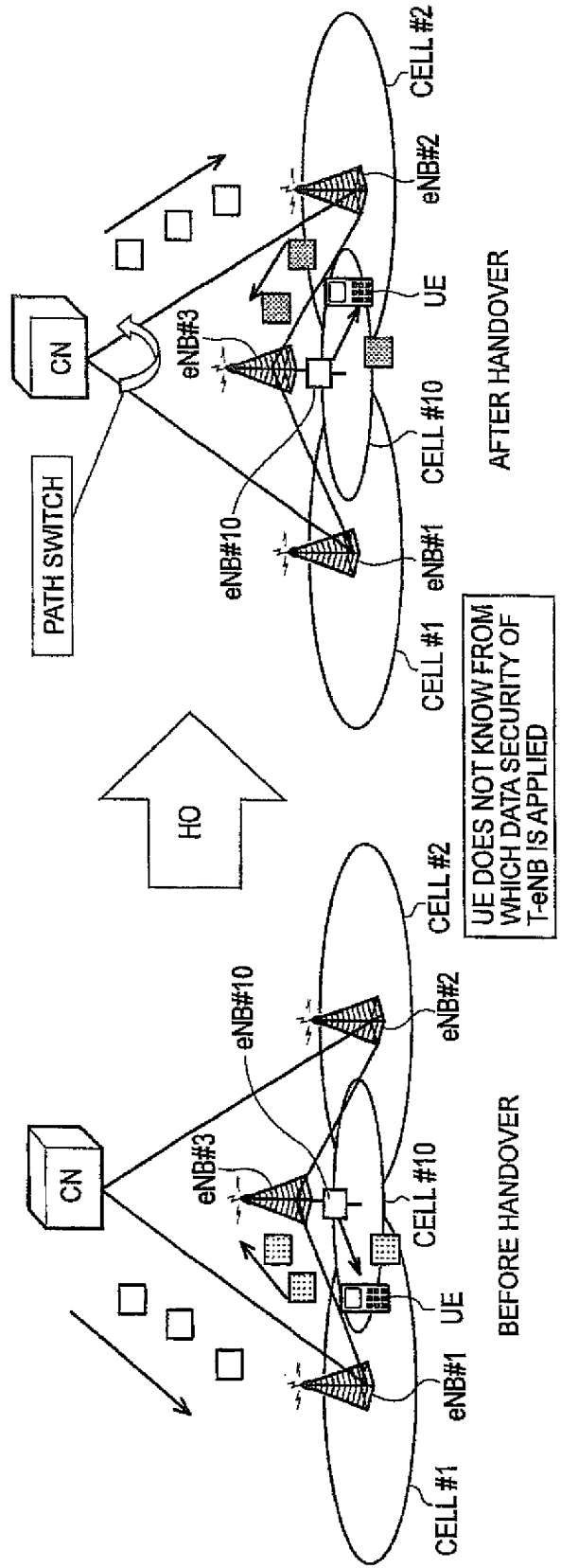

FIG. 5 is a view for explaining a conventional art.
FIG. 6 is a view for explaining the conventional art.
FIG. 7 is a view for explaining the conventional art.
FIG. 8 is a view for explaining the conventional art.

DETAILED DESCRIPTION (Mobile Communication System in First Embodiment of Present Invention)

A mobile communication system in a first embodiment of the present invention is described with reference to FIGS. 1 to 4.

Figure 1:
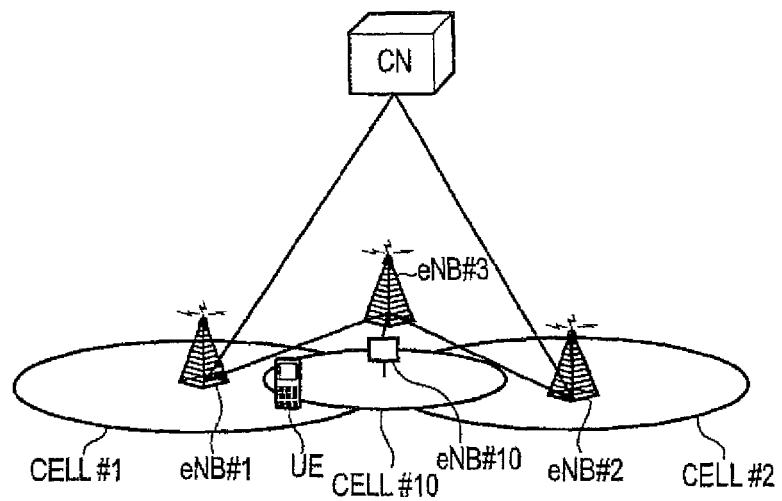
FIG. 1 is an overall configuration diagram of a mobile communication system in a first embodiment of the present invention.

As shown in FIG. 1, the mobile communication system of the embodiment includes a radio base station eNB#1 configured to manage a cell #1, a radio base station eNB#2 configured to manage a cell #2, a radio base station eNB#3 configured to manage a cell #3 (not illustrated), and a radio base station eNB#10 (small radio base station) connected under the radio base station eNB#3 and configured to manage a cell #10.

In this system, the cell #10 is a small cell (phantom cell) and the cell #1 is a macro cell. Note that the coverage area of the cell #10 and the coverage area of each of the cell #1 and the cell #2 are arranged to at least partially overlap each other.

As shown in FIG. 1, the mobile communication system in the embodiment is a LTE mobile communication system and is configured such that "Inter-site CA" can be applied thereto.

Specifically, in the mobile communication system of the embodiment, a mobile station UE is configured to be capable of performing the "Inter-site CA" through the cell #1 under the radio base station eNB#1 and the cell #10 under the radio base station eNB#10.

The mobile communication system is configured such that a C-plane signal can be transmitted and received between the radio base station eNB#1 and the mobile station UE through a C-plane bearer, and a U-plane signal can be transmitted and received therebetween through a U-plane bearer in the "Inter-site CA".

Moreover, the mobile communication system is configured such that the U-plane signal can be transmitted and received between the radio base station eNB#10 and the mobile station UE through the U-plane bearer, but the C-plane signal cannot be transmitted and received therebetween.

In the mobile communication system of the embodiment, the mobile station UE is configured to be capable of similarly performing the "Inter-site CA" through the cell #2 under the radio base station eNB#2 and the cell #10 under the radio base station eNB#10.

The mobile communication system is configured such that the C-plane signal can be transmitted and received between the radio base station eNB#2 and the mobile station UE through the C-plane bearer, and the U-plane signal can be transmitted and received therebetween through the U-plane bearer in the "Inter-site CA".

Moreover, the mobile communication system is configured such that the U-plane signal can be transmitted and received between the radio base station eNB#10 and the mobile station UE through the U-plane bearer, but the C-plane signal cannot be transmitted and received therebetween.

Moreover, the embodiment is described by taking as an example a case where the mobile station UE switches (performs a handover) from a state where the mobile station UE performs CA through the cell #10 and the cell #1 under the radio base station eNB#1 to a state where the mobile station UE performs CA through the cell #10 and the cell #2 under the radio base station eNB#2.

In this case, the radio base station eNB#1 and the radio base station eNB#2 are configured to manage security data (security information) in the cells #1 to #3 under the radio base stations eNB#1 to eNB#3, and the radio base station eNB#3 and the radio base station eNB#10 are configured not to manage security data in the cell #10 under the radio base station eNB#10.

Note that, in the switching described above, the radio base station eNB#1 or the radio base station eNB#2 is configured to notify the mobile station UE of information indicating from which PDCP-PDU the security data in the cell #2 is to be applied.

For example, the radio base station eNB#1 or the radio base station eNB#2 may be configured to notify a COUNT value of the first PDCP-PDU to which the security data in the cell #2 is to be applied as the aforementioned information.

The COUNT value herein is formed of HFN (Hyper Frame Number) and PDCP-SN (Sequence Number).

Moreover, the radio base station eNB#1 may be configured to notify the aforementioned information by using "Handover Command".

Furthermore, the radio base station eNB#1 or the radio base station eNB#2 may be configured to include the aforementioned information in each of PDCP-PDUs.

Moreover, the radio base station eNB#2 may be configured to transmit a signal indicating the aforementioned switching before transmitting a PDCP-PDU to the mobile station UE and the mobile station UE receives this signal and then applies the security data in the cell #2.

Figure 2:
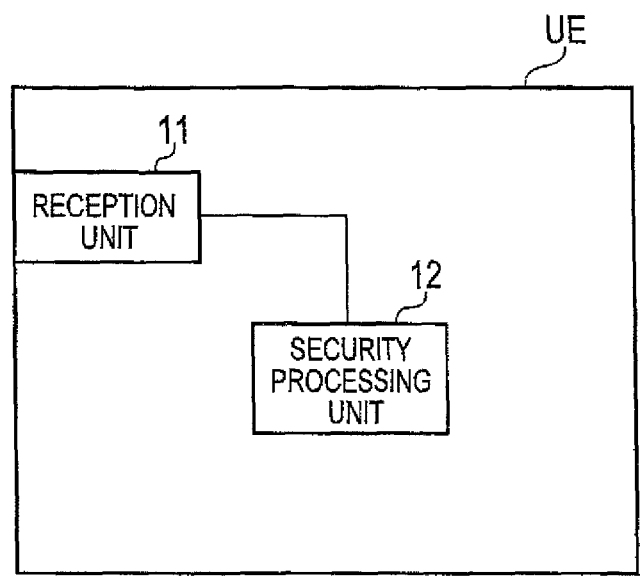
FIG. 2 is a functional block diagram of a mobile station UE in the first embodiment of the present invention.

As shown in FIG. 2, the mobile station UE of the embodiment includes a reception unit 11 and a security processing unit 12.

The reception unit 11 is configured to receive various signals from the radio base station eNB#1, the radio base station eNB#2, the radio base station eNB#3, the radio base station eNB#10, and the like.

For example, the reception unit 11 is configured to receive the aforementioned information, a signal indicating the aforementioned switching, and the like.

The security processing unit 12 is configured to perform security processing with the radio base station eNB#1, the radio base station eNB#2, the radio base station eNB#3, and the radio base station eNB#10 by using the security data.

For example, the security processing unit 12 is configured to perform "Integrity Protection/Integrity Verification" for verifying (checking) integrity in a PDCP layer, "Ciphering/Deciphering" for ciphering and deciphering, and the like as security processing.

Specifically, "Integrity Protection/Integrity Verification" is performed to protect control signals (for example, RRC signaling) transmitted and received between the mobile station UE and the radio base station eNB such that no falsification of data is performed on the control signals by a malicious mobile station, a malicious radio base station, or the like.

Conceivable examples of the security data used to perform "Integrity Protection/Integrity Verification" include parameters such as "Security Key ($K_{RRC\_int}$)" indicating a secret key used to perform "Integrity Protection/Integrity Verification", "Ciphering Algorithm (EIA0/EIA1/EIA2)" indicating an algorithm used to perform "Integrity Protection/Integrity Verification", "BEARER" for indentifying a bearer, "COUNT" indicating the COUNT value, "DIRECTION" indicating a type of a line, and the like.

For example, the security processing unit 12 may be configured to perform "Integrity Protection" by inputting "Security Key", "COUNT", "BEARER", "DIRECTION", and "MESSAGE (message itself to be transmitted)" into a specified algorithm and assigning an outputted data series to the control signal as "MAC-I.

Moreover, the security processing unit 12 may be configured to perform "Integrity Verification" by inputting "Security Key", "COUNT", "BEARER", "DIRECTION", and "MESSAGE (message itself to be transmitted)" into a specified algorithm, setting an outputted data series as "X-MAC", and comparing "X-MAC" and "MAC-I" assigned to the received control signal with each other.

Meanwhile, "Ciphering/Deciphering" is performed to protect the control signals (for example, RRC signaling) and data signals (U-plane signals) between the mobile station UE and the radio base station eNB such that an unauthorized third party cannot listen to the control signals and the data signals.

Conceivable examples of the security data used to perform "Ciphering/Deciphering" include parameters such as "Security Key ($K_{RRC\_enc}/K_{UP\_enc}$)" indicating a secret key used to perform "Ciphering/Deciphering", "Ciphering Algorithm (EIA0/EIA1/EIA2)" indicating an algorithm used to perform "Ciphering/Deciphering", "BEARER" for indentifying a bearer, "LENGTH" indicating the length of data which is a ciphering target, "COUNT" indicating the COUNT value, "DIRECTION" indicating a type of a line, and the like.

For example, the security processing unit 12 may be configured to perform "Ciphering" by inputting "Security Key", "COUNT", "BEARER", "DIRECTION", and "LENGTH" into a specified algorithm and calculating an exclusive OR between an outputted data series and the data which is a ciphering target (in a case of the control signals, RRC signaling and MAC-I, in a case of the data signals, U-plane signals).

Moreover, the security processing unit 12 may be configured to perform "Deciphering" by inputting "Security Key", "COUNT", "BEARER", "DIRECTION", and "LENGTH" into a specified algorithm and calculating an exclusive OR between an outputted data series and a received ciphered data series.

Note that the security processing unit 12 is configured to perform the security processing using the security data in the cell #2 (radio base station eNB#2), from the PDCP-PDU notified by the aforementioned information.

For example, the security processing unit 12 may be configured to perform the security processing using the security data in the cell #2 (radio base station eNB#2) after receiving the signal indicating the aforementioned switching.

Operations of the mobile communication system in the embodiment are described below with reference to FIGS. 3 and 4.

Firstly, the operations of the mobile communication system in the embodiment are described with reference to FIG. 3.

Figure 3:
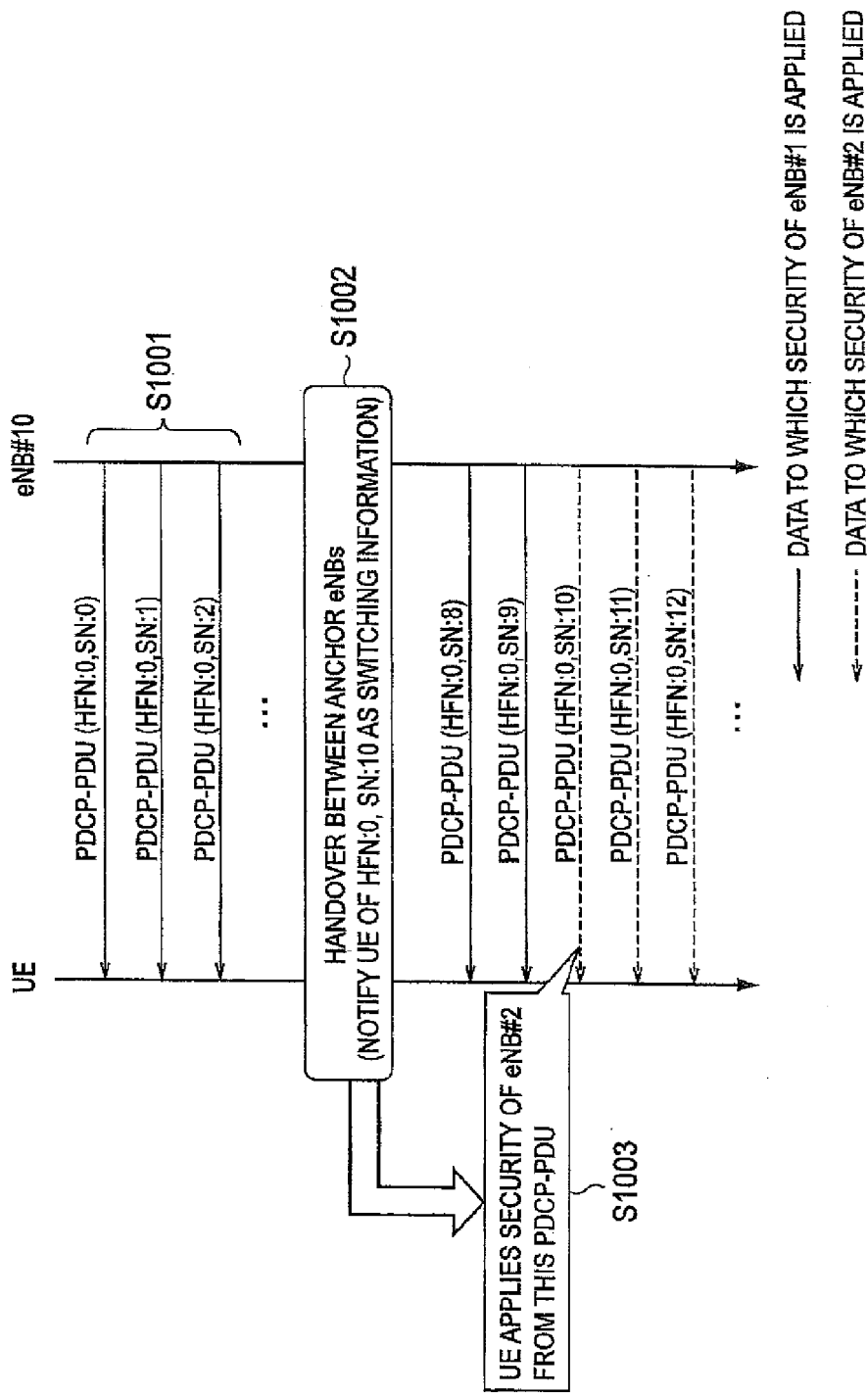
FIG. 3 is a sequence diagram showing operations of the mobile communication system in the first embodiment of the present invention.

As shown in FIG. 3, in step S1001, the mobile station UE performs the CA through the cell #1 under the radio base station eNB#1 and the cell #10 under the radio base station eNB#10, and receives PDCP-PDUs from the radio base station eNB#1 and the radio base station eNB#10.

When the mobile station UE performs a handover to switch from a state where the CA is performed through the cell #1 and the cell #10 to a state where the CA is performed through the cell #2 and the cell #10 in step S1002, the mobile station UE performs the security processing using the security data in the cell #2, on a PDCP-PDU (in the example of FIG. 3, the PDCP-PDU in which HFN=0/PDCP-SN=10) notified by the radio base station eNB#1 or the radio base station eNB#2 and subsequent PDCP-PDUs in step S1003.

Secondly, operations of the mobile station UE in the embodiment are described with reference to FIG. 4.

Figure 4:
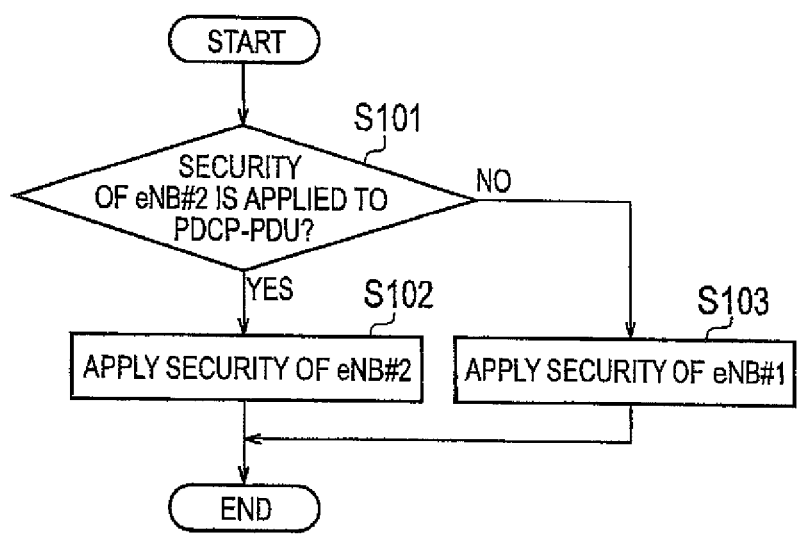
FIG. 4 is a flowchart showing operations of the mobile station UE in the first embodiment of the present invention.

As shown in FIG. 4, when the mobile station UE performs a handover to switch from the state where the CA is performed through the cell #1 and the cell #10 to the state where the CA is performed through the cell #2 and the cell #10, the mobile station UE determines in step S101 whether the security data in the cell #2 (radio base station eNB#2) is to be applied to a received PDCP-PDU, on the basis of the aforementioned information.

If "YES", the mobile station UE performs the security processing using the security data in the cell #2 (radio base station eNB#2) on the received PDCP-PDU in step S102.

Meanwhile, if "NO", the mobile station UE performs the security processing using the security data in the cell #1 (radio base station eNB#1) on the received PDCP-PDU in step S103.

The features of the present embodiment may also be expressed as follows.

A first feature of the present embodiment is summarized as a mobile communication system including: a radio base station eNB#1 (first radio base station); a radio base station eNB#2 (second radio base station); a radio base station eNB#3 (third radio base station); and a radio base station eNB#10 (small radio base station) connected under the radio base station eNB#3. Here, the radio base station eNB#1 and the radio base station eNB#2 are configured to manage security data in cells #1 to #3 under control, and the radio base station eNB#3 and the radio base station eNB#10 are configured to manage no security data in a cell #10 (small cell) under control, when a mobile station UE switches from a state where CA is performed through the cell #10 and a cell #1 (first cell) under the radio base station eNB#1 to a state where the CA is performed through the cell #10 and a cell #2 (second cell) under the radio base station eNB#2, the mobile station UE is configured to be notified of information indicating from which PDCP-PDU the security data in the cell #2 is to be applied.

According to the mobile communication system of the embodiment, when the mobile station UE connected to a plurality of radio base stations eNB performs a handover while performing the "Inter-site CA", the mobile station UE is configured to be notified of the information indicating from which PDCP-PDU the security data in the cell #2 is to be applied. Consequently, the mobile station UE can perform appropriate security processing.

In the first feature of the embodiment, a COUNT value of a first PDCP-PDU to which the security data in the cell #2 is to be applied may be notified as the information described above.

According to the mobile communication system of the embodiment, it is possible to accurately notify the mobile station UE from which PDCP-PDU the security data in the cell #2 is to be applied, by using the COUNT value of the PDCP-PDU.

In the first feature of the embodiment, the information described above may be notified by using a "Handover Command (handover instruction signal)".

According to the mobile communication system of the embodiment, it is possible to notify the mobile station UE from which PDCP-PDU the security data in the cell #2 is to be applied by using a signal for the existing handover processing.

In the first feature of the embodiment, the information described above may be included in each of PDCP-PDUs.

According to the mobile communication system of the embodiment, since the information indicating from which PDCP-PDU the security data in the cell #2 is to be applied is included in each of PDCP-PDUs, it is possible to avoid a situation where the mobile station UE fails to acquire the information.

In the first feature of the embodiment, in the switching described above, the radio base station eNB#2 may be configured to transmit a signal indicating the switching before transmitting a PDCP-PDU to the mobile station UE, and the mobile station UE may be configured to apply the security data in the cell #2 after receiving the signal.

According to the mobile communication system of the embodiment, it is possible to avoid a situation where a reception timing of the aforementioned information becomes later than a reception timing of the PDCP-PDU from which the application of the security data in the cell #2 is to be started.

A second feature of the present embodiment is summarized as a radio base station eNB in a mobile communication system including a radio base station eNB#1, a radio base station eNB#2, a radio base station eNB#3, and a radio base station eNB#10 connected under the radio base station eNB#3, the radio base station capable of operating as the radio base station eNB#1 or the radio base station eNB#2. Here, the radio base station eNB is configured to manage security data in cells under control, and when a mobile station UE switches from a state where CA is performed through the cell #1 and a cell #10 to a state where the CA is performed through the cell #2 and a cell #10, the radio base station eNB is configured to notify the mobile station UE of information indicating from which PDCP-PDU the security data in the cell #2 is to be applied.

A third feature of the present embodiment is summarized as a mobile station UE capable of communicating with a radio base station eNB#1, a radio base station eNB#2, a radio base station eNB#3, and a radio base station eNB#10 connected under the radio base station eNB#3. Here, in a case where the radio base station eNB#1 and the radio base station eNB#2 are configured to manage security data in cells under control and the radio base station eNB#3 and the radio base station eNB#10 are configured to manage no security data in a small #10 under control, when the mobile station UE switches from a state where CA is performed through the cell #1 and a cell #10 to a state where the CA is performed through the cell #2 and a cell #10, the mobile station UE is configured to determine from which PDCP-PDU the security data in the cell #2 is to be applied according to a notification from the radio base station eNB#1 or the radio base station eNB#2.

It should be noted that the foregoing operations of the mobile stations UE, the radio base stations eNB#1/eNB#2/eNB#3/eNB#10, and a core network apparatus CN may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE, the radio base stations eNB#1/eNB#2/eNB#3/eNB#10, and a core network apparatus CN. Otherwise, the storage medium and the processor may be provided as discrete components inside the mobile stations UE, the radio base stations eNB#1/eNB#2/eNB#3/eNB#10, and a core network apparatus CN.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-256260 (filed on Nov. 22, 2012) is incorporated by reference in the present specification.

INDUSTRIAL APPLICABILITY

As described above, the present invention can provide a mobile communication system, a radio base station, and a mobile station which enable a mobile station UE to perform appropriate security processing when the mobile station UE connected to a plurality of radio base stations eNB performs a handover while performing the "Inter-site CA".

EXPLANATION OF THE REFERENCE NUMERALS eNB#1, eNB#2, eNB#3, eNB#10 radio base station
UE mobile station
11 reception unit
12 security processing unit

The invention claimed is:

1. A mobile communication system comprising:
a first radio base station;
a second radio base station;
a third radio base station; and
a fourth radio base station connected under the third radio base station, wherein
the first radio base station and the second radio base station are configured to manage security data in cells under control, and the third radio base station and the fourth radio base station are configured to manage no security data in a fourth cell under control,
when a mobile station switches from a state where carrier aggregation is performed through the fourth cell and a first cell under the first radio base station to a state where the carrier aggregation is performed through the fourth cell and a second cell under the second radio base station, the mobile station is configured to be notified of information indicating from which PDCP-PDU the security data in the second cell is to be applied, and
wherein the fourth base station does not manage security data for the fourth cell.

2. The mobile communication system according to claim 1, wherein a COUNT value of a first PDCP-PDU to which the security data in the second cell is to be applied is notified as the information.

3. The mobile communication system according to claim 1, wherein the mobile station is notified of the information by a handover instruction signal received from the first radio base station or the second radio base station.

4. The mobile communication system according to claim 1, wherein the information is included in each of PDCP-PDUs.

5. The mobile communication system according to claim 1, wherein, in the switching, the second radio base station is configured to transmit a signal indicating the switching before transmitting a PDCP-PDU to the mobile station, and the mobile station is configured to apply the security data in the second cell after receiving the signal.

6. The mobile communication system according to claim 2, wherein the information is notified by using a handover instruction signal.

7. The mobile communication system according to claim 2, wherein the information is included in each of PDCP-PDUs.

8. The mobile communication system according to claim 3, wherein the information is included in each of PDCP-PDUs.

9. A radio base station in a mobile communication system, the mobile communication system including a first radio base station, a second radio base station, a third radio base station, and a fourth radio base station connected under the third radio base station, the radio base station capable of operating as the first radio base station or the second radio base station in the mobile communication system, the radio base station comprising:
a processor, wherein
the radio base station is configured to manage security data in cells under control, and
when a mobile station switches from a state where carrier aggregation is performed through a fourth cell under the fourth radio base station and a first cell under the first radio base station to a state where the carrier aggregation is performed through the fourth cell and a second cell under the second radio base station, the radio base station is configured to notify the mobile station of information indicating from which PDCP-PDU the security data in the second cell is to be applied, and
wherein the fourth base station does not manage security data for the fourth cell.

10. A mobile station capable of communicating with a first radio base station, a second radio base station, a third radio base station, and a fourth radio base station connected under the third radio base station, the mobile station comprising:
a processor, wherein
in a case where the first radio base station and the second radio base station are configured to manage security data in cells under control and the third radio base station and the fourth radio base station are configured to manage no security data in a fourth cell under control, when the mobile station switches from a state where carrier aggregation is performed through the fourth cell under the fourth radio base station and a first cell under the first radio base station to a state where the carrier aggregation is performed through the fourth cell and a second cell under the second radio base station, the mobile station is configured to determine from which PDCP-PDU the security data in the second cell is to be applied according to a notification from the first radio base station or the second radio base station, and
wherein the fourth base station does not manage security data for the fourth cell.

* * * * *